(12) United States Patent
Ozaki et al.

(10) Patent No.: US 7,684,135 B2
(45) Date of Patent: Mar. 23, 2010

(54) LENS DEVICE

(75) Inventors: Takao Ozaki, Saitama (JP); Koichi Nagata, Saitama (JP); Motohiko Horio, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 5 days.

(21) Appl. No.: 12/023,937

(22) Filed: Jan. 31, 2008

(65) Prior Publication Data

US 2008/0225414 A1  Sep. 18, 2008

(30) Foreign Application Priority Data

Mar. 14, 2007  (JP) .......................... P2007-065902

(51) Int. Cl.
G02B 7/02 (2006.01)
(52) U.S. Cl. ....................... 359/823; 359/819
(58) Field of Classification Search ................. 359/691, 359/808, 819
See application file for complete search history.

(56) References Cited

U.S. PATENT DOCUMENTS 6,972,910 B2 * 12/2005 Orimo et al. ................ 359/694
7,068,429 B1   6/2006 Ori
2006/0152806 A1 * 7/2006 Noguchi et al. ............. 359/557

FOREIGN PATENT DOCUMENTS

| JP | 60-171636 A    | 9/1985  |
|----|----------------|---------|
| JP | 2002-350702 A  | 12/2002 |
| JP | 2003-279822 A  | 10/2003 |
| JP | 2003-279823 A  | 10/2003 |

* cited by examiner

*Primary Examiner*—Scott J Sugarman
*Assistant Examiner*—Vipin M Patel
(74) *Attorney, Agent, or Firm*—Birch, Stewart, Kolasch & Birch, LLP (57) ABSTRACT

A lens device is provided and includes: a lens barrel body; a lens frame swingably attached to the lens barrel body; and a swing mechanism being adapted to swing the lens frame so that alignment of an optical axis of the lens device can be effected, the swing mechanism including: an elastic unit interposed between the lens barrel body and the lens frame, the elastic unit biasing the lens barrel body and the lens frame in directions away from each other or in directions nearing to each other; and an advancing and retracting unit disposed at three points in a circumferential direction defined by the lens barrel body and the lens frame, the advancing and retracting unit advancing or retracting the lens frame relative to the lens barrel body against a bias force of the elastic unit to swing the lens frame.

9 Claims, 7 Drawing Sheets

LENS DEVICE

BACKGROUND OF THE INVENTION

1. Field of the Invention

The present invention relates to a lens devices, and more particularly to a lens device in which its lens frame can be optically adjusted relative to the lens barrel body through swinging thereof.

2. Description of Related Art

JP-A-2002-350702 discloses an optical adjustment structure in which the lens frame is optically adjusted relative to the lens barrel of a lens device.

In the optical adjustment structure of JP-A-2002-350702, a projection is formed in the rear of the lens frame. By placing the projection in abutment against any of a plurality of step faces, i.e. an adjustment form, provided stepwise in a manner circumferentially continuing with the lens barrel, the spacing between the lens frame and the lens barrel is adjusted into the best state of optical adjustment. Thereafter, the lens frame is axially aligned into a direction orthogonal to the optical axis in the state that the projection is abutted against any of the step faces. In the position where optical adjustment is in the best state, the lens frame and the lens barrel is joined together by bonding.

However, the optical adjustment structure of JP-A-2002-350702 is in a complicated structure that the projection is formed in the lens frame and the step-like adjustment form is formed in the lens barrel. In addition, two types of adjustments, i.e. spacing adjustment and axial alignment are required in its optical adjustment, which are troublesomeness adjustments.

SUMMARY OF THE INVENTION

An object of an illustrative, non-limiting embodiment of the invention is to provide a lens device whose lens frame can be optically adjusted relative to the lens barrel with use of simple structure and by easy operation.

According to an aspect of the invention, there is provided a lens device including: a lens barrel body; a lens frame swingably attached to the lens barrel body; and a swing mechanism being adapted to swing the lens frame so that alignment of an optical axis of the lens device can be effected, the swing mechanism including: an elastic unit interposed between the lens barrel body and the lens frame, the elastic unit biasing the lens barrel body and the lens frame in directions away from each other or in directions nearing to each other; and an advancing and retracting unit arranged at three points in a circumferential direction defined by the lens barrel body and the lens frame, the advancing and retracting unit advancing or retracting the lens frame relative to the lens barrel body against a bias force of the elastic unit to swing the lens frame.

According to the lens device, the elastic unit is interposed between the lens barrel body and the lens frame so that the lens barrel body and the lens frame can be biased in directions away from each other or in directions nearing to each other. By properly operating the advancing and retracting unit arranged at three points in a circumferential direction defined by the lens barrel body and the lens frame, the lens frame is advanced or retracted relative to the lens barrel body against the bias force of the elastic unit or by utilization of the bias force of the elastic unit, thereby effecting optical adjustment. Due to this, the lens frame can be optically adjusted relative to the lens barrel body with use of a simple structure.

In the lens device, the elastic unit of the swing mechanism may include a leaf spring member in a ring form, and the advancing and retracting unit of the swing mechanism may have: a V-groove formed in one of the lens barrel body and the lens frame; and a setscrew attached in the other of the lens barrel body and the lens frame and being urged on and abutted against one of slant surfaces of the V-groove by a biasing force of the leaf spring member. The lens frame can be advanced and retracted relative to the lens barrel body by adjusting a screwing amount of the setscrew.

According to the lens device, because the setscrew if screwed in pushes the slant surface of the V-groove, the lens frame can be moved by the component force of the push force acting in the direction of the imaging optical axis. Meanwhile, loosening the setscrew moves the lens frame in the reverse direction. Therefore, by properly adjusting the screwing amount of three setscrews, the lens frame can be positionally changed relative to the lens barrel body, thus easily effecting optical adjustment.

In the invention of claim 3, thee lens device is a four-grouped lens device having first, second, third and fourth lens groups, the first lens group being a front lens held in the lens frame, the second lens being a variator lens to be moved in a direction of a imaging optical axis, the third lens group being a vibration-proof lens and the fourth lens group being a focus lens.

The lens device is one of exemplary lens devices of the present invention, in which a four-grouped structure is applied. The lens device includes a first lens group as a front lens held in a lens frame of the invention, a second lens as a variator lens to change the focal length, a third lens group as a vibration-proof lens and a fourth lens group as a focus lens, in the order of from the front side to the rear side on the optical axis. In such a four-grouped lens device, the front lens is optically adjusted as the final adjustment operation after the lens device has been assembled. Therefore, the final optical adjustment is facilitated according to the four-grouped lens device having the optical adjustment structure.

BRIEF DESCRIPTION OF THE DRAWINGS

The features of the invention will appear more fully upon consideration of the exemplary embodiment of the invention, which are schematically set forth in the drawings, in which.

10: lens device; 11: lens barrel body; 12: first lens group; 14: second lens group; 16: third lens group; 18: fourth lens group; 20: color separation prism; 22, 24 and 26: imaging devices; 28 and 30 guide bars; 32, 34 and 50: lens frames; 35: lens frame; 37: elastic member; 39: advancing and retracting member; 41: leaf spring member, 43: V-groove; 45: setscrew; 51: mask; 62 and 92: plate-like motor coils; and 72 and 102: magnets.

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the invention, an elastic member is interposed between a lens barrel body and a lens frame, to bias the lens barrel body and the lens frame in directions away from each other or in directions nearing to each other. By properly operating an advancing and retracting member at three points in a circumferential direction defined by the lens barrel body and the lens frame, optical adjustment is structurally effected. Due to this, the lens frame can be optically adjusted relative to the lens barrel body with use of a simple structure.

In accordance with the appended drawings, explanation will be now made on lens devices according to exemplary embodiments of the present invention.

Figure 1:
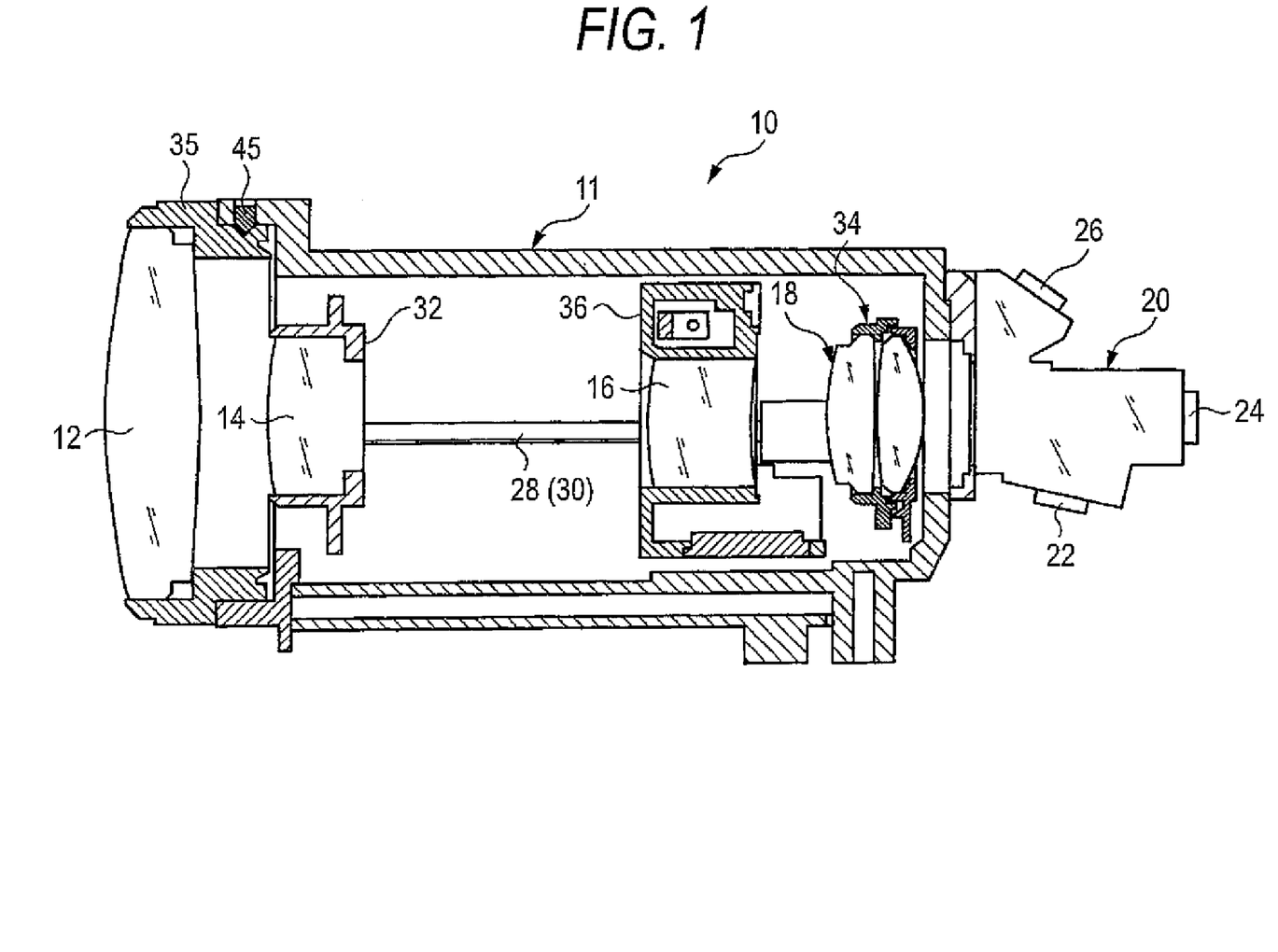
FIG. 1 is a sectional view showing a lens device according to an exemplary embodiment of the invention.

FIG. 1 shows a side sectional view of a lens device according to an exemplary embodiment of the present invention. The lens device 10 includes a first lens group 12, a second lens group 14, a third lens group 16 and a fourth lens group 18, in the order from the front (closer to a subject) to the rear (closer to an image) with respect to the imaging optical axis thereof. The subjective light, passed through the first to fourth lens groups 12 to 18, is focused, through a color separation prism 20 constituting a color-separation optical system, on imaging devices 22, 24, 26 provided at the R, G and B exit ends of the color separation prism 20. Incidentally, a camera body (not shown), to which the lens device 10 is attached, mounts thereon a signal processing circuit, etc. (not shown) that performs required processing (white balance, γ-correction, etc.) on the image signal obtained from the imaging devices 22, 24, 26 and produces a video signal in a form.

The first lens group 12 is so-called a front lens and the second lens group 14 is a variator lens for changing the focal length. The third lens group 16 is a vibration-proof lens to be driven in a direction canceling the vibrations as caused by unintentional movement or so, and the fourth lens group 18 is a focus lens for focal adjustment.

The first to fourth lens groups 12 to 18 are held within a lens barrel body 11. Within the lens barrel body 11, a pair of guide bars 28, 30 (see FIGS. 1 and 7) are arranged extending in parallel with the optical axis. On the guide bars 28, 30, there are slidably supported a lens frame 32 of the second lens group 14 and a lens frame 34 of the fourth lens group 18. Furthermore, a casing 36 of the third lens group 16 is fixed on the guide bars 28, 30. The casing 36 may be fixed directly on the lens barrel body 11.

The second lens group 14 is provided with a nut (not shown) structuring a screw feed device. To the nut, screw-coupled is a feed screw (not shown) structuring a screw feed device similarly. The feed screw is arranged in parallel with the optical axis, having an end coupled to the output shaft of a stepping motor (not shown) for zooming. The zooming stepping motor has a zoom driver circuit (not shown) so that when a zoom signal is outputted thereto from the camera body, the zooming stepping motor rotates the feed screw in a direction corresponding to the relevant signal. Due to this, the second lens group 14 is moved back and forth in the optical-axis direction along the guide bars 28, 30, thus being adjusted at a desired focal length.

The fourth lens group 18 is similarly provided with a nut (not shown) structuring a screw feed device. To the nut, screwed is a feed screw (not shown) structuring a screw feed device similarly. The feed screw is arranged in parallel with the optical axis, having an end coupled to the output shaft of a focusing stepping motor (not shown). The focusing stepping motor has a focus driver circuit (not shown) so that, when a focus signal is outputted thereto from the camera body, the focusing stepping motor rotates the feed screw in a direction corresponding to the relevant signal. Due to this, the fourth lens group 18 is moved back and forth in the optical-axis direction along the guide bars 28, 30, thus effecting focal adjustment.

Now, the structure of the vibration-proof mechanism will be explained.

Figure 2:
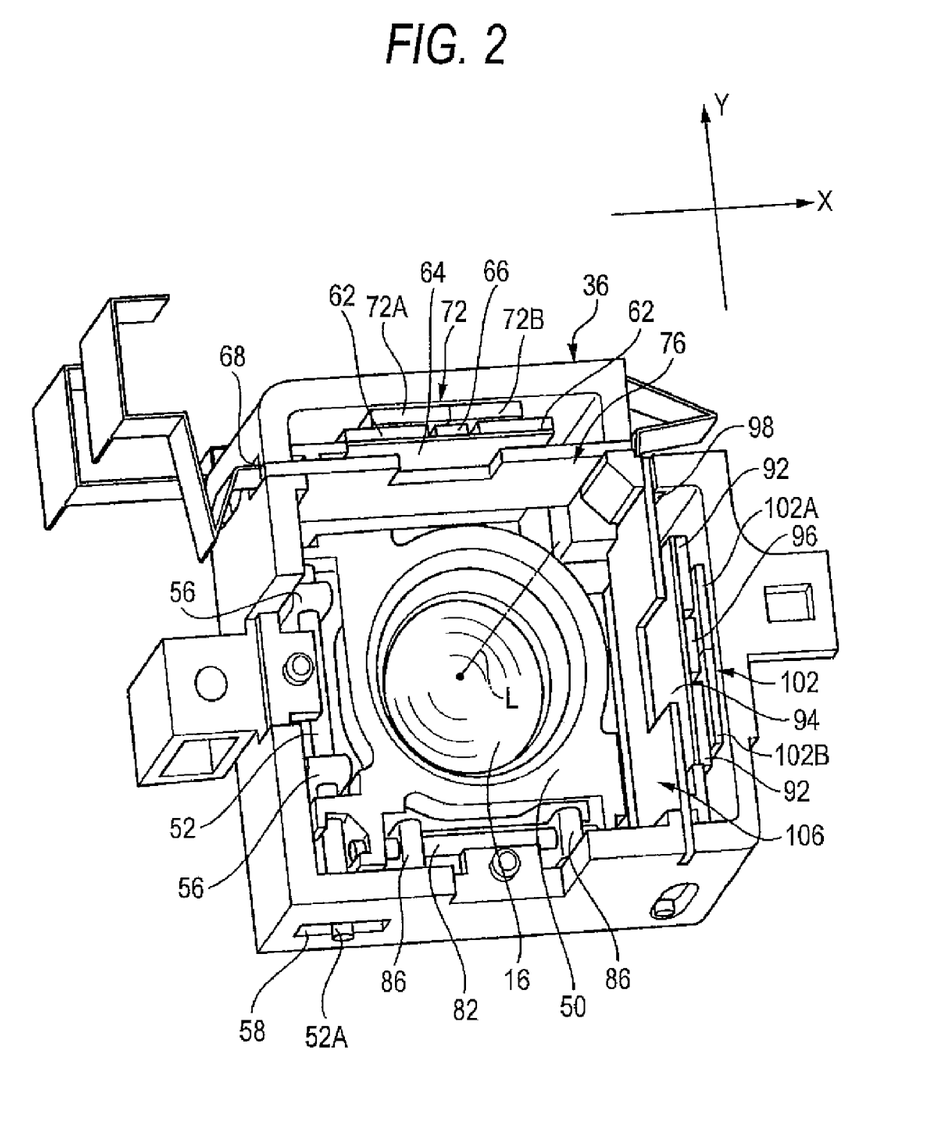
FIG. 2 is a perspective view of a casing furnished with a vibration-proof lens of the lens device shown in FIG. 1, as viewed from the rear on the imaging optical axis.
Figure 3:
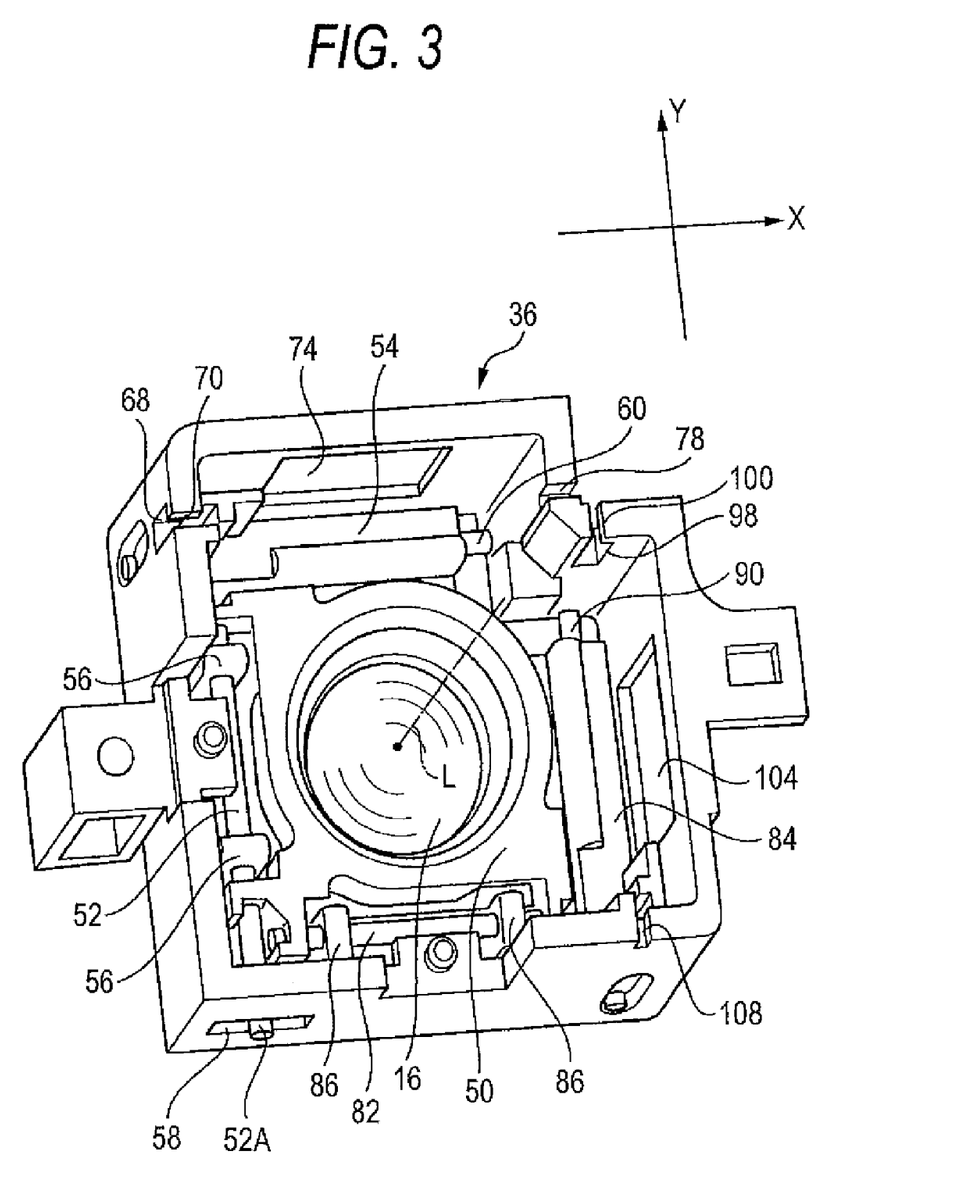
FIG. 3 is a perspective view of the casing shown in FIG. 2 removed of an actuator.

FIG. 2 is a perspective view of the casing 36 furnished with a vibration-proof lens 16 as viewed from rear while FIG. 3 is a perspective view of the casing 36 shown in FIG. 2 removed of an actuator.

As shown in those figures, the third lens group (referred herein to as a vibration-proof lens for convenience sake) 16 is held in a lens frame 50. The lens frame 50 is supported to move in different two directions on a plane orthogonal to the imaging optical axis L. From now on, the moving directions of the vibration-proof lens 16 are taken as X (horizontal in FIGS. 2 and 3) and Y (vertical in FIGS. 2 and 3) directions. The mechanism for moving the vibration-proof lens 16 in the X direction is referred to as an X-moving mechanism while the mechanism for moving it in the Y direction is referred to as a Y-moving mechanism.

First, the X-moving mechanism will be explained.

A lens frame 50 is fixed with a moving guide bar 52. The moving guide bar 52 is arranged in the Y direction so that a slider 54 can be engaged with the moving guide bar 52. The slider 54 is formed in an L-form having upper and left side portions. On the left side portion, there are formed two guides 56, 56 protruding in the optical-axis. The guides 56 are respectively formed with guide holes (not shown) in the Y direction so that the moving guide bars 52 are passed through the guide holes. Due to this, the slider 54 is engaged over the movable guide bar 52 in a manner to slide in the Y direction. Accordingly, the lens frame 50 is supported to slide in the Y direction by means of the slider 54. The lens frame 50 is restricted from moving in the X direction so that, when the slider 54 is moved in the X direction, the lens frame 50 is also moved in the X direction.

Incidentally, the moving guide bar 52 has a lower end 52A, in the figure, in engagement with an elongate hole 58 formed in the X direction in the casing 36. This prevents the lens frame 50 from inclining (inclining relative to the optical axis).

A guide hole (not shown) is formed in the X direction in the upper side portion of the slider 54, so that a fixed guide bar 60 is passed through the guide hole. The fixed guide bar 60 is arranged in the X direction, the both ends of which are fixed to the casing 36. Due to this, the slider 54 is supported for sliding in the X direction along the fixed guide bar 60. Sliding the slider 54 in the X direction causes the lens frame 50, engaged with the left side portion of the slider 54 through moving guide bar 52, to slide in the X direction.

Meanwhile, a plate-like motor coil product name: "Fine Pattern Coil" (Registered Trademark)) 62 is fixed on the upper side portion thereof. The motor coil 62 is bonded, at its underside, an output end of a flexible printed board 64. The motor coil 62 is arranged in the X direction, in a position around the outer periphery of the vibration-proof lens 16. The flexible printed board 64 is secured with a position sensor 66, such as a Hall element, through alignment.

The flexible printed board 64 is extended in the X direction from the motor coil 62 to the outside of the casing 36 through a side opening 68 of the casing 36. The flexible printed board 64, extended to the outside, is bent toward the outer. After a V-formed (or U-formed) bent portion is formed, it is extended from a predetermined position of the lens barrel body 11 (see FIG. 1) to the outside of the lens barrel body 11. The lead-out flexible printed board 64 is connected to a unit that takes control of supplying power and operating the vibration-proof lens 16. Incidentally, the side opening 68 of the casing 36 is in communication with the end surface of the casing 36 through a slit 70. By passing the flexible printed board 64 through the slit 70, the flexible printed board 64 is arranged to the inside of the side opening 68.

On the outer side of the motor coil 62, a magnet 72 is arranged opposed to the motor coil 62. The magnet 72 is formed in a rectangular plate form and arranged such that the S and N poles 72A, 72B are arranged in the X direction. The foregoing position sensor 66 is arranged opposite to the boundary of the S and N poles 72A, 72B of the magnet 72, to detect a change of magnet field. The detected signal is outputted to the unit through the flexible printed board 64.

A metal plate (not shown), to serve as a yoke, is provided on the outer side of the magnet 72. The metal plate is to be attracted toward the magnet 72 through the action of the magnetic force of the magnet 72. The metal plate is formed in a rectangular form greater than the magnet 72, and attached in the state that the edge thereof protrudes from the magnet 72. The casing 36 has an outer surface formed with a recess in a size equal to the metal plate, on the inner side of which is formed an opening 74 in a size equal to the magnet 72. The metal plate is received in the recess of the casing 36 while the magnet 72 is received in the opening 74.

On the inner side of the motor coil 62, a metal plate 76, to serve as a yoke, is arranged in the X direction and oppositely to the motor coil 62. The metal plate 76 has one end inserted in the slit 70 and the other end inserted in the groove 78 formed in the casing 36, thereby being fixed in the casing 36.

The X-moving mechanism, constructed as above, is arranged with the motor coil 62 in the magnetic field formed by the magnet 72 and two metal plates (one omitted in showing) 76. By energizing the motor coil 62, the motor coil 62 and the supporting slider 54 undergo a force in the X direction. Accordingly, the slider 54 and the lens frame 50 are moved in the X direction, thus moving the vibration-proof lens 16 in the X direction. The description made so far is on the vibration-proof mechanism.

Now explanation will be made on the Y-moving mechanism.

The lens frame 50 is fixed with a moving guide bar 82. The moving guide bar 82 is arranged in the X direction so that a slider 84 can be engaged with the moving guide bar 82. The slider 84 is formed in an L-form having upper and left side portions. On the left side portion, there are formed two guides 86, 86 protruding in the optical-axis direction. The guides 86 are respectively formed with guide holes (not shown) in the X direction so that the movable guide bars 82 are passed through the guide holes. Due to this, the slider 84 is engaged over the movable guide bar 82 in a manner to slide in the X direction. Accordingly, the lens frame 50 is supported for sliding in the X direction by means of the slider 84. The lens frame 50 is restricted from moving in the Y direction so that, when the slider 54 is moved in the Y direction, the lens frame 50 is also moved in the Y direction.

A guide hole (not shown) is formed in the Y direction in the right side portion of the slider 84, so that a fixed guide bar 90 is passed through the guide hole. The fixed guide bar 90 is arranged in the Y direction, the both ends of which are fixed to the casing 36. Due to this, the slider 84 is supported for sliding in the Y direction along the fixed guide bar 90. Sliding the slider 84 in the Y direction causes the lens frame 50, engaged with the lower side portion of the slider 54 through moving guide bar 52, to slide in the X direction.

Meanwhile, a plate-like motor coil (product name: "Fine Pattern Coil" (Registered Trademark)) 92 is fixed on the right side portion of the slider 54. The motor coil 92 is bonded, at its left surface, an output end of a flexible printed board (hereinafter, referred to as "flexible printed board") 94. The motor coil 92 is arranged in the Y direction, in a position around the outer periphery of the vibration-proof lens 16. The flexible printed board 94 is secured with a position sensor 96, such as a Hall element, through alignment.

The flexible printed board 94 is extended in the Y direction from the motor coil 92 to the outside of the casing 36 through a side opening 98 of the casing 36. The flexible printed board 64, extended to the outside, is bent toward the outer. After a V-formed (or U-formed) bent portion is formed, it is extended from a predetermined position of the lens barrel body 11 (see FIG. 1) to the outside of the lens barrel body 11. The lead-out flexible printed board 94 is connected to the unit that takes control of supplying power and operating the vibration-proof lens 16. Incidentally, the side opening 98 of the casing 36 is in communication with the end surface of the casing 36 through a slit 100. By passing the flexible printed board 94 through the slit 100, the flexible printed board 94 is arranged to the inside of the side opening 98.

On the outer side of the motor coil 92, a magnet 102 is arranged opposed to the motor coil 92. The magnet 102 is formed in a rectangular plate form and arranged such that the S and N poles 102A, 102B are arranged in the Y direction. The foregoing position sensor 96 is arranged opposite to the boundary of the S and N poles 102A, 102B of the magnet 102, to detect a change of magnet field. The detected signal is outputted to the unit through the flexible printed board 94.

A metal plate (not shown), to serve as a yoke, is provided on the outer side of the magnet 102. The metal plate is to be attracted toward the magnet 102 through the action of the magnetic force of the magnet 102. The metal plate is formed in a rectangular form greater than the magnet 102, and attached in the state that the edge thereof protrudes from the magnet 72. The casing 36 has an outer surface formed with a recess in a size equal to the metal plate, on the inner side of which is formed an opening 104 in a size equal to the magnet 102. The metal plate is received in the recess of the casing 36 while the magnet 102 is received in the opening 104.

On the inner side of the motor coil 92, a metal plate 106, to serve as a yoke, is arranged in the Y direction and oppositely to the motor coil 92. The metal plate 106 has one end inserted in the slit 100 and the other end inserted in the groove 108 formed in the casing 36, thereby being fixed in the casing 36.

The Y-moving mechanism, constructed as above, is arranged with the motor coil 92 in the magnetic field formed by the magnet 102 and two metal plates (one omitted in showing) 106. By energizing the motor coil 92, the motor coil 92 and the supporting slider 84 undergo a force in the Y direction. Accordingly, the slider 84 and the lens frame 50 are moved in the Y direction, thus moving the vibration-proof lens 16 in the Y direction. The description made so far is on the vibration-proof mechanism.

Figure 4:
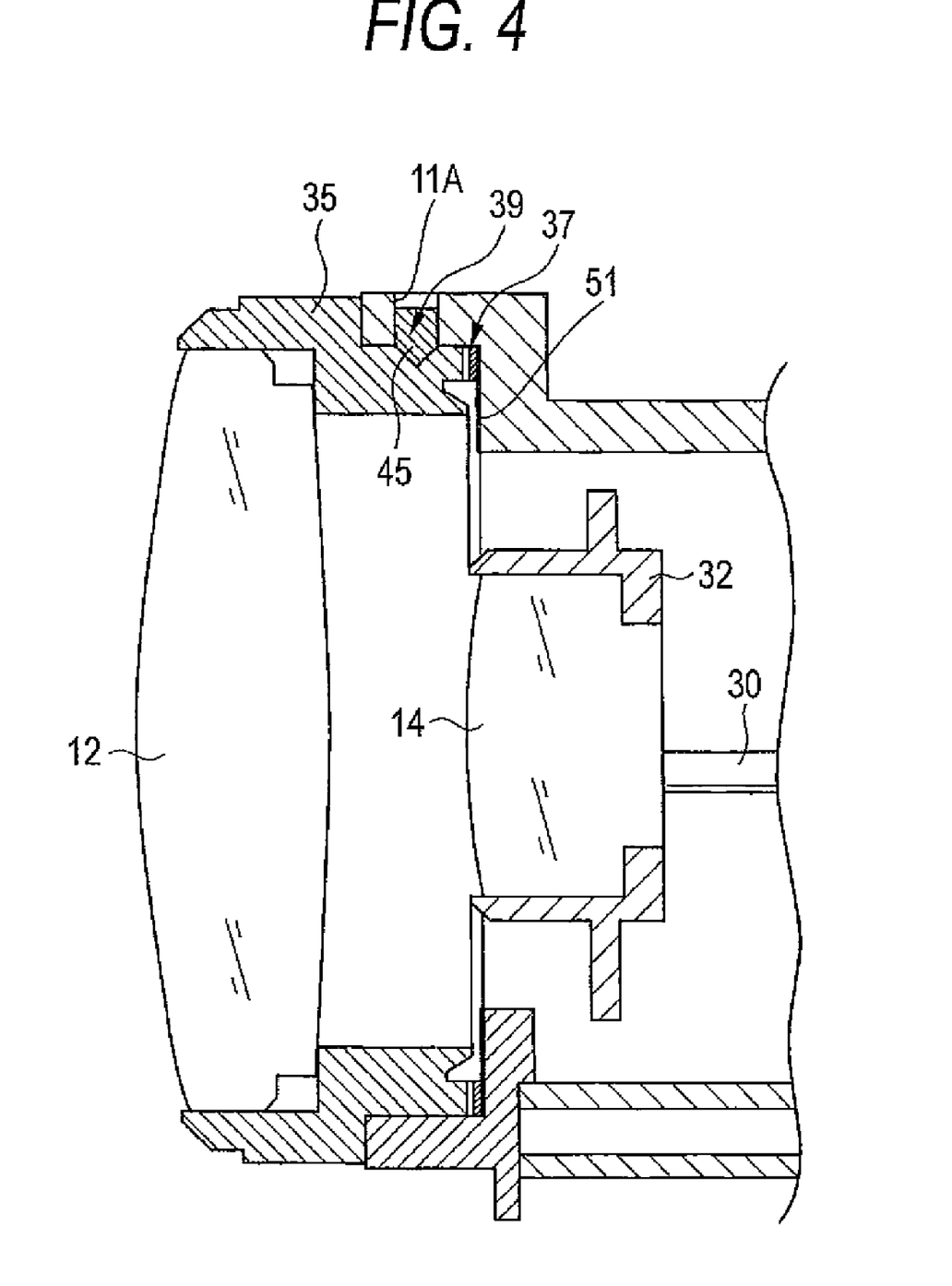
FIG. 4 is a sectional view showing a junction between a lens frame of a front lens and a lens barrel body.

FIG. 4 shows a sectional view that a lens frame 35 of a first lens group (referred here to as a front lens, for convenience sake) 12 is swingably attached in a lens barrel body 11 through an optically-adjusting swing mechanism.

The swing mechanism, shown in the figure, is structured with an elastic member 37 interposed between the lens barrel body 11 and the lens frame 35 and biasing the lens barrel body 11 and the lens frame 35 in direction going away from each other, and an advancing and retracting member 39 at three points in a circumferential direction defined by the lens barrel body 11 and lens frame 35 at circumferential three points and for optically axially advancing or retracting the lens frame relative to the lens barrel body 11 against the bias force of the elastic member 37 and swinging the lens frame 35. The advancing and retracting member 39 is arranged equally spaced in the circumferential direction.

Figure 5:
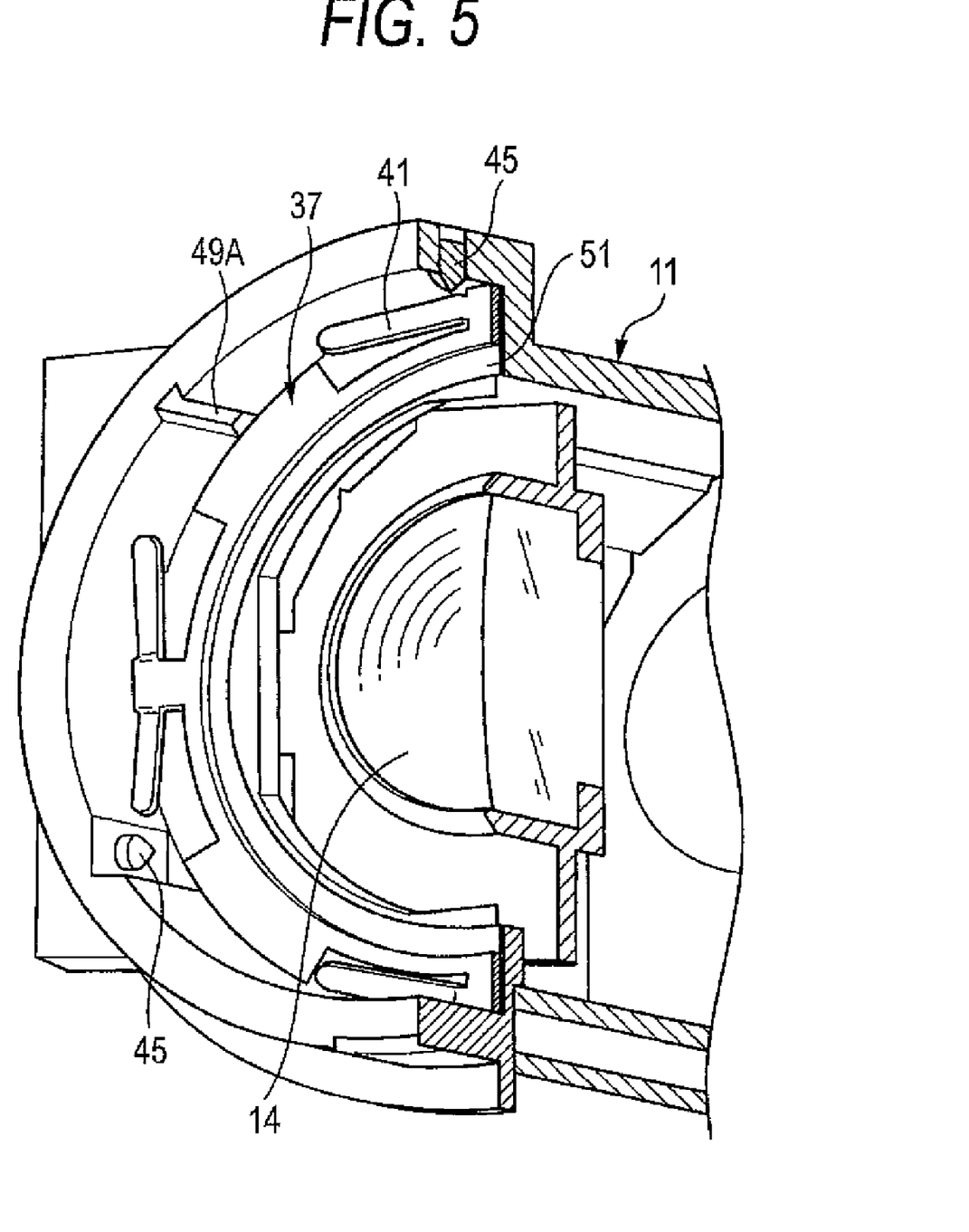
FIG. 5 is a semi-sectional view showing a leaf spring member attached on the side of the lens barrel body.

FIG. 5 is a semi-cross-sectional view wherein the elastic member 37 is structured by a ring-formed leaf spring member 41. The advancing and retracting member 39, shown in FIG. 4, is structured with a V-groove 43 formed in the lens frame 35 at three points (two points in the figure) as shown in FIG. 6, and setscrews 45 screwed in screw holes 11A formed in the lens barrel body 11 and abutted against one of slant surfaces 43A of the V-groove 43 by means of a bias force of the leaf spring member 41.

Figure 6:
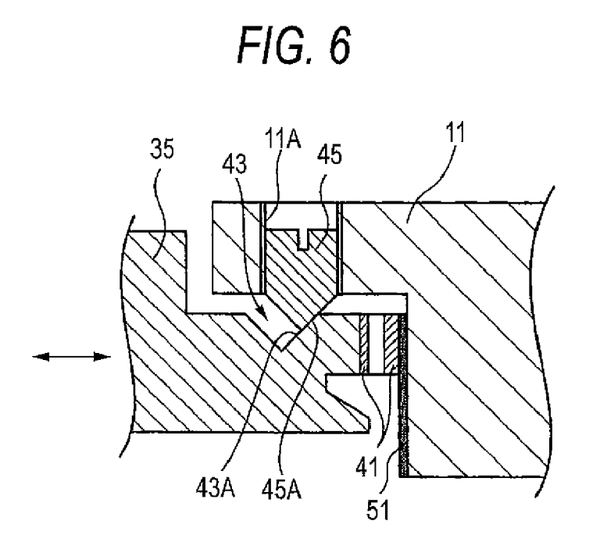
FIG. 6 is a part magnifying sectional view showing a state of engagement between a setscrew and a V-groove.
Figure 7:
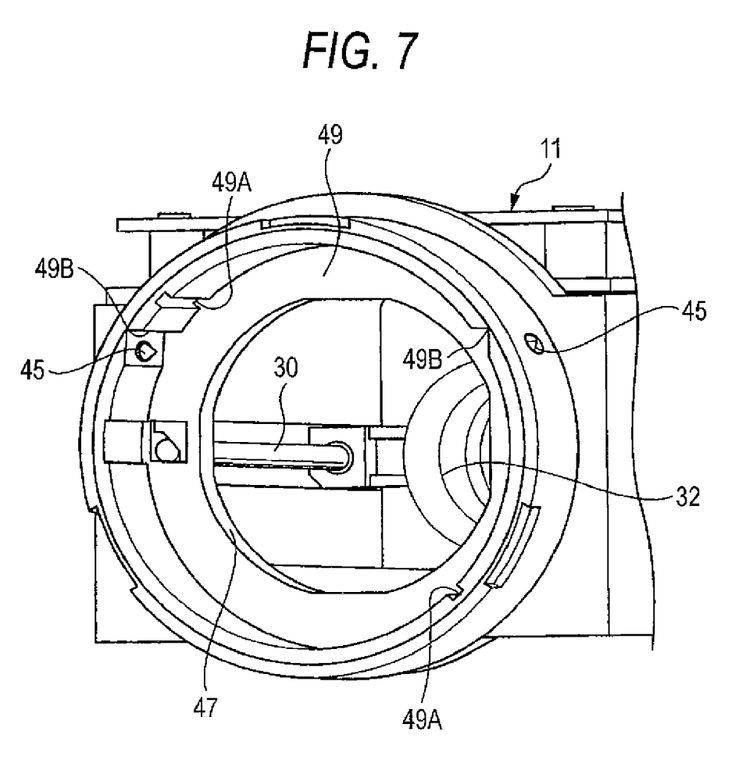
FIG. 7 is a perspective view showing an inner flange of the lens barrel body.

The leaf spring member 41, in FIG. 6, is arranged as shown in FIG. 6, along an inner flange 49 generally in a ring form and formed with an aperture 47 for taking subjective light into the lens barrel body 11 as shown in FIG. 7. The aperture 47 is formed as an elongate hole vertically long because stainless-steel guide bars 28, 30 are arranged on left and right within the lens barrel body 11. Namely, this is because, if the aperture 47 is made in the form of a true circle, the useless light entering laterally of the aperture reflects upon the guide bars 28, 30 and causes a ghost phenomenon. In order to cut off the useless light reaching the guide bars 28, 30, the aperture 47 is formed as an elongate hole that is long vertically.

Figure 8:
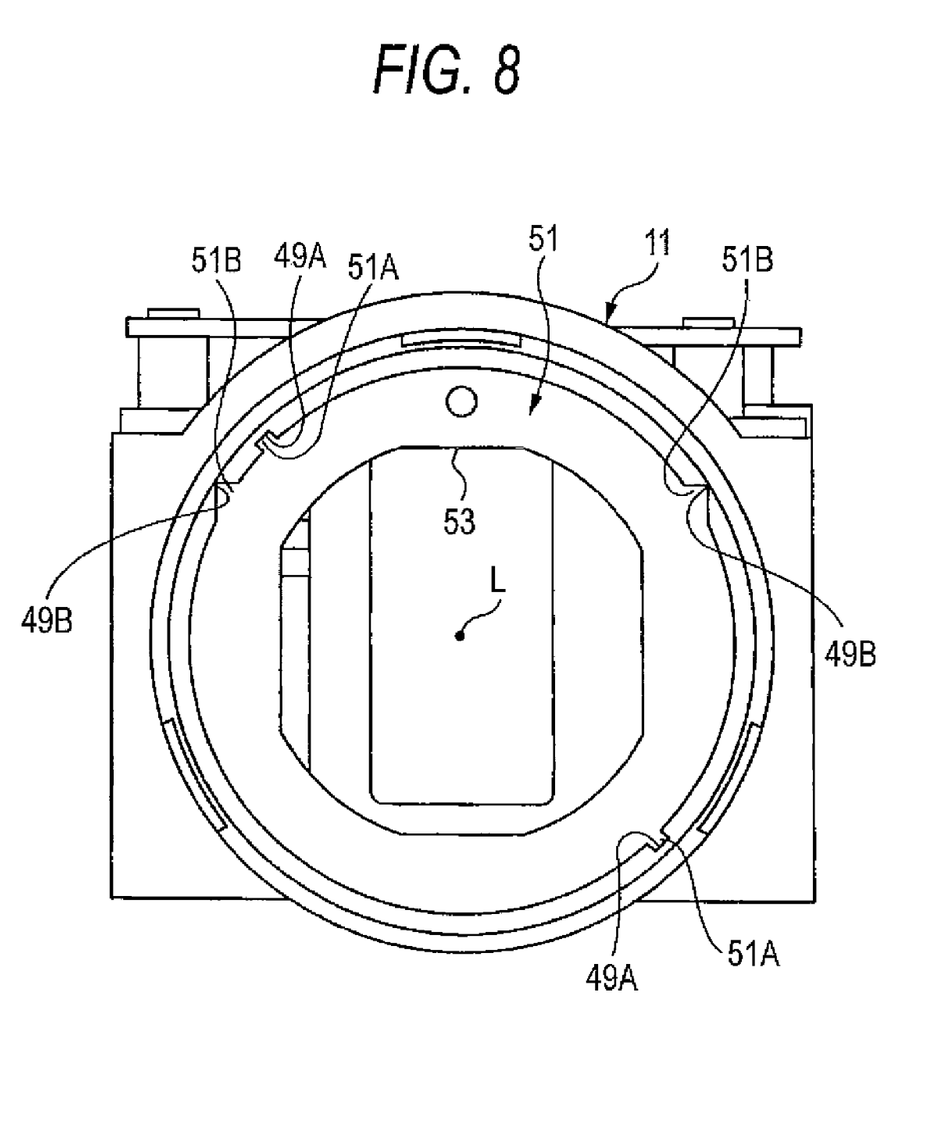
FIG. 8 is a front view that a mask is put on the inner flange of the lens barrel body, wherein some of reference numerals in the drawings are set forth below.

Meanwhile, in order to prevent the ghost phenomenon as caused by the useless light reflected upon the inner peripheral surface of the aperture 47, a ring-formed mask 51 shown in FIG. 8 is spread over the inner peripheral flange 49. The aperture 53 of the mask 51 is vertically long corresponding to the aperture 47 and formed somewhat smaller than the aperture 47 of the inner flange 49. Due to this, the mask 51 cuts off the light to reach the inner peripheral surface of the aperture 47, thus preventing the occurrence of ghost phenomenon.

In the mask 51, rectangular projections 51A, 51A and triangular projections 511B, 511B are integrally formed in order to align the mask 51 with the inner flange 49. Correspondingly to the projections 51A, 51B, the inner flange 49 is formed with rectangular recesses 49A, 49A and triangular recesses 49B, 491B. Both the triangular projections 51B, 51B and the triangular recesses 49B, 49B are arranged in positions symmetric left and right whereas both the rectangular projections 51A, 51A and rectangular recesses 49A, 49A are arranged in positions symmetric about the imaging optical axis L. By fitting the triangular projections 51B, 51B respectively in the triangular recesses 49B, 49B and the rectangular projections 51A, 51A respectively in the rectangular recesses 49A, 49A, the mask 51 is aligned with the inner flange 49 by being regulated at the upper, lower, left and right as well as at the main and back surfaces. The mask 51 has a surface (surface closer to the subject) over which an adhesive sheet is formed integrally or separately. The adhesive sheet is to adhere the dust and dirt intruding from the exterior or chips of the tens frame 35 cut by the setscrew 45, referred later. For this reason, in aligning the mask 51, the rectangular projections 51A, 51A and the rectangular recesses 49A, 49A are required to regulate the mask 51 at its main and back surfaces.

The setscrew 45 and v-groove 43, shown in FIG. 6, is arranged in three points equally spaced on the circumference. In FIG. 6, by the bias force of the leaf spring member 41, the setscrew 45 is abutted at its lower slant surface 45A against a slant surface 43A of the V-groove 43.

In this state, in case the setscrew 45 is screwed in, the slant surface 45A of the setscrew 45 pushes the slant surface 43A of the V-groove 43. By the force component of the push force acting in the imaging optical axis (force acting toward right in FIG. 6), the lens frame 35 is moved toward right in FIG. 6. Meanwhile, in case the setscrew 45 is loosened, the lens frame 35 is moved toward left in FIG. 6 by the bias force of the leaf spring member 41. Therefore, by properly adjusting the screwing amount of the three setscrews, the lens frame 35 can be swung relative to the lens barrel body 1. Because the lens frame 35 can be changed in position, optical adjustment can be carried out easily.

Incidentally, optical adjustment means an optical adjustment to be carried out while confirming a spot image by means of a collimator. The lens frame 35 is properly changed in position relative to the lens barrel body 11. The lens frame 35 is fixed to the lens barrel body 11 through adhesive or the like, in the best position where the spot image is seen clearly.

In the embodiment, the lens barrel body 11 and the lens frame 35 were biased in directions away from each other by means of the leaf spring member 41. However, this is not limitative, i.e. the effect is obtainable similarly if the lens barrel body 11 and the lens frame 35 are biased in directions nearing to each other by the elastic member whose bias force acts in the reverse direction. Meanwhile, although the v-groove 43 was formed on the side of the lens frame 35 while the setscrews 45 was attached on the side of the lens barrel body 1, it is satisfactory to attach a setscrew 45 on the side of the lens frame 35 and to form a V-groove 43 on the side of the lens barrel body 11 where the lens frame 35 is structurally fit over the outer periphery of the lens barrel body 11.

Meanwhile, in the four-grouped lens structure of the embodiment, the front lens 12 is optically adjusted as the final adjustment operation after the lens device 10 has been assembled. Therefore, optical adjustment is easily carried out in the final adjustment, according to the four-grouped lens device 10 having the optical adjustment structure according to the embodiment.

This application claims foreign priority from Japanese Patent Application No. 2007-65902 filed Mar. 14, 2007, the contents of which is herein incorporated by reference.

What is claimed is:

1. A lens device comprising:
a lens barrel body;
a lens frame swingably attached to the lens barrel body; and
a swing mechanism being adapted to swing the lens frame so that alignment of an optical axis of the lens device can be effected, the swing mechanism including:
an elastic unit interposed between the lens barrel body and the lens frame, the elastic unit biasing the lens barrel body and the lens frame in directions away from each other or in directions nearing to each other; and
an advancing and retracting unit disposed at three points in a circumferential direction defined by the lens barrel body and the lens frame, the advancing and retracting unit advancing or retracting the lens frame relative to the lens barrel body against a bias force of the elastic unit to swing the lens frame, wherein the advancing and retracting unit has a V-groove in one of the lens barrel body and the lens frame and a setscrew attached in the other of the lens barrel body and the lens frame, the setscrew being pushed on a slant surface of the V-groove by a biasing force of the elastic unit.

2. The lens device according to claim 1, which is a four-grouped lens device including a first lens group, a second lens group, a third lens group, and a fourth lens group,
the first lens group being a front lens held in the lens frame, the second lens being a variator lens moving in a direction of an imaging optical axis, the third lens group being a vibration-proof lens, and the fourth lens group being a focus lens.

3. The lens device according to claim 1, wherein
when said setscrew is screwed in, a slant surface of the setscrew pushes said slant surface of said V-groove and said lens frame is moved along the optical axis, and
when said setscrew is loosened, said lens frame is moved in a reverse direction along the optical axis.

4. The lens device according to claim 1, wherein said V-groove is formed in the lens barrel body or in the lens frame, and said setscrew is attached in the other of the lens barrel body and the lens frame.

5. The lens device according to claim 1, wherein the advancing and retracting unit has three setscrews, and adjustment of said three setscrews changes the position of said lens frame with respect to the lens barrel body, to perform optical adjustment.

6. A lens device comprising:
a lens barrel body;
a lens frame swingably attached to the lens barrel body; and
a swing mechanism being adapted to swing the lens frame so that alignment of an optical axis of the lens device can be effected, the swing mechanism including:
an elastic unit interposed between the lens barrel body and the lens frame, the elastic unit biasing the lens barrel body and the lens frame in directions away from each other or in directions nearing to each other; and
an advancing and retracting unit disposed at three points in a circumferential direction defined by the lens barrel body and the lens frame, the advancing and retracting unit advancing or retracting the lens frame relative to the lens barrel body against a bias force of the elastic unit to swing the lens frame,
wherein
the elastic unit includes a leaf spring member in a ring form, and
the advancing and retracting unit has: a V-groove in one of the lens barrel body and the lens frame; and a setscrew attached in the other of the lens barrel body and the lens frame and being urged on one of slant surfaces of the V-groove by a biasing force of the leaf spring member,
the lens frame being advanced or retracted relative to the lens barrel body by adjusting a screwing amount of the setscrew.

7. The lens device according to claim 6, which is a four-grouped lens device including a first lens group, a second lens group, a third lens group, and a fourth lens group,
the first lens group being a front lens held in the lens frame, the second lens being a variator lens moving in a direction of an imaging optical axis, the third lens group being a vibration-proof lens, and the fourth lens group being a focus lens.

8. The lens device according to claim 6, wherein the leaf spring member is arranged along an inner flange in a ring form and is formed with an aperture having a shape of an elongated hole.

9. The lens device according to claim 8, further comprising a ring-formed mask spread over said inner flange, wherein an aperture of said ring-formed mask is vertically long corresponding to said aperture of said inner flange, and said aperture of said ring-formed mask is smaller than said aperture of said inner flange.

* * * * *